(12) United States Patent
Kim et al.

(10) Patent No.: US 12,051,828 B2
(45) Date of Patent: Jul. 30, 2024

(54) BATTERY PACK AND DEVICE INCLUDING THE SAME

(71) Applicant: LG CHEM, LTD., Seoul (KR)

(72) Inventors: Do Hyeon Kim, Daejeon (KR); Duck Hee Moon, Daejeon (KR); Yongjoon Choi, Daejeon (KR); Subin Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 701 days.

(21) Appl. No.: 17/282,616

(22) PCT Filed: Jan. 17, 2020

(86) PCT No.: PCT/KR2020/000877
§ 371 (c)(1),
(2) Date: Apr. 2, 2021

(87) PCT Pub. No.: WO2020/149704
PCT Pub. Date: Jul. 23, 2020

(65) Prior Publication Data
US 2021/0391632 A1    Dec. 16, 2021

(30) Foreign Application Priority Data

Jan. 17, 2019  (KR) .......................... 10-2019-0006225

(51) Int. Cl.
*H01M 50/547*    (2021.01)
*H01M 10/42*    (2006.01)
(Continued)

(52) U.S. Cl.
CPC ....... *H01M 50/547* (2021.01); *H01M 10/425* (2013.01); *H01M 50/296* (2021.01);
(Continued)

(58) Field of Classification Search
CPC .. H01M 50/547; H01M 50/50; H01M 50/517; H01M 50/505
See application file for complete search history.

(56) References Cited

U.S. PATENT DOCUMENTS

| 5,021,013 A | 6/1991 | Wiesler |
| 9,153,799 B2 | 10/2015 | Kim et al. |

(Continued)

FOREIGN PATENT DOCUMENTS

| CN | 105280851 A | 1/2016 |
| CN | 106374062 A | 2/2017 |

(Continued)

OTHER PUBLICATIONS

International Search Report (PCT/ISA/210) issued in PCT/KR2020/000877 mailed on May 6, 2020.
(Continued)

*Primary Examiner* — Kenneth J Douyette
(74) *Attorney, Agent, or Firm* — Birch, Stewart, Kolasch & Birch, LLP

(57) ABSTRACT

A battery pack includes a battery module having electrode terminals; a battery module frame accommodating the battery module; an upper housing including at least one through opening and covering an upper portion of the battery module frame; a busbar positioned at an upper portion of the battery module frame and connected to the electrode leads of the battery module; an internal bolt positioned at an upper portion of the battery module frame, protruding upward through the through opening and connected to the busbar; and a terminal passing through the through opening to be connected to the busbar and the internal bolt, wherein the terminal includes a nut-shaped fastening part which is fastened with the internal bolt.

14 Claims, 5 Drawing Sheets

(51) Int. Cl.
  *H01M 50/296* (2021.01)
  *H01M 50/50* (2021.01)
  *H01M 50/505* (2021.01)
  *H01M 50/517* (2021.01)
  *H01M 50/528* (2021.01)
  *H01M 50/204* (2021.01)
  *H01M 50/262* (2021.01)
  *H01M 50/284* (2021.01)

(52) U.S. Cl.
  CPC ......... *H01M 50/50* (2021.01); *H01M 50/505* (2021.01); *H01M 50/517* (2021.01); *H01M 50/528* (2021.01); *H01M 50/204* (2021.01); *H01M 50/262* (2021.01); *H01M 50/284* (2021.01)

(56) References Cited

U.S. PATENT DOCUMENTS

| | | | |
|---|---|---|---|
| 9,306,194 | B2 | 4/2016 | Kim et al. |
| 9,865,845 | B2 | 1/2018 | Kim et al. |
| 9,882,178 | B2 | 1/2018 | Kim et al. |
| 10,109,839 | B2 | 10/2018 | Deng et al. |
| 10,141,546 | B2 | 11/2018 | Kim et al. |
| 10,333,131 | B2 | 6/2019 | Deng et al. |
| 2011/0223466 | A1* | 9/2011 | Lee .................... H01M 50/296 439/627 |
| 2011/0287289 | A1 | 11/2011 | Kim |
| 2013/0323574 | A1 | 12/2013 | Tsunaki et al. |
| 2014/0003016 | A1* | 1/2014 | McCabe ............. H01M 50/507 361/776 |
| 2016/0372736 | A1 | 12/2016 | Kim et al. |
| 2017/0025663 | A1 | 1/2017 | Kim |
| 2018/0034012 | A1 | 2/2018 | Yu et al. |
| 2018/0053921 | A1 | 2/2018 | Kim et al. |

FOREIGN PATENT DOCUMENTS

| | | |
|---|---|---|
| CN | 107431159 A | 12/2017 |
| CN | 207165693 U | 3/2018 |
| EP | 2 667 429 A1 | 11/2013 |
| EP | 3 010 072 A1 | 4/2016 |
| EP | 3 261 151 A1 | 12/2017 |
| JP | 5-109399 A | 4/1993 |
| JP | 2018-521468 A | 8/2018 |
| KR | 10-1209935 B1 | 12/2012 |
| KR | 10-2014-0025583 A | 3/2014 |
| KR | 10-2014-0128846 A | 11/2014 |
| KR | 10-2015-0140120 A | 12/2015 |
| KR | 10-2016-0129597 A | 11/2016 |
| KR | 10-2018-0058552 A | 6/2018 |

OTHER PUBLICATIONS

Extended European Search Report for European Application No. 20741913.6, dated Nov. 4, 2021.

* cited by examiner

[FIG. 7]
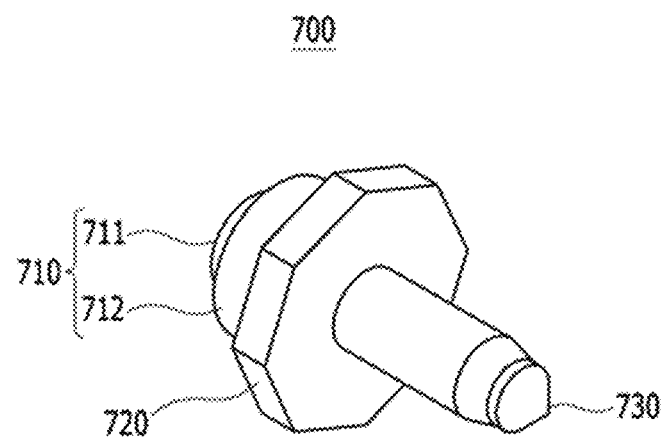

BATTERY PACK AND DEVICE INCLUDING THE SAME

TECHNICAL FIELD

Cross Citation with Related Application(s)

This application claims the benefit of Korean Patent Application No. 10-2019-0006225 filed on Jan. 17, 2019 with the Korean Intellectual Property Office, the disclosure of which is incorporated herein by reference in its entirety.

The present disclosure relates to a battery pack and a device including the same, and more particularly, to a battery pack including a terminal bolt, and a device including the same.

BACKGROUND ART

In modern society, as portable devices such as a mobile phone, a notebook computer, a camcorder and a digital camera has been daily used, the development of technologies in the fields related to mobile devices as described above has been activated. In addition, rechargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel, and therefore, there is an increasing need for development of the secondary battery.

Currently commercialized secondary batteries include a nickel cadmium battery, a nickel hydrogen battery, a nickel zinc battery, a lithium secondary battery and the like. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior material, i.e., battery case, which seals and accommodates the electrode assembly together with an electrolyte.

Generally, the lithium secondary battery may be classified into a can type secondary battery in which the electrode assembly is embedded in a metal can, and a pouch-type secondary battery in which the electrode assembly is embedded in a pouch of an aluminum laminate sheet, depending on the shape of the exterior material.

In the case of a secondary battery used for a small-sized device, two to three battery cells are arranged, but in the case of a secondary battery used for a medium to large-sized device such as an automobile, a battery pack in which a large number of battery cells are electrically connected is used.

This battery pack usually includes a plurality of secondary batteries, and the plurality of secondary batteries are connected to each other in series and in parallel, thereby enhancing the capacity and output. Such a battery pack includes a battery module having a plurality of secondary batteries in a stacked form, a battery module frame accommodating the battery module in the inner space, and an upper housing surrounding the battery module frame. In addition, in order to use such a battery pack, the battery pack and an external device must be electrically connected through a connecting member such as a connecting wire. For this connection, the battery pack may be provided with a terminal as a connection terminal.

Conventionally, for the coupling of the terminal, a method of fixing the terminal using an additional bolt, a method of coupling the terminal by bonding, or the like was used. However, in the case of using the additional bolt, a sealing member is additionally required between the bolt and the terminal, which causes a problem that the structure is complicated and the cost is increased; and in the case of the bonding, there is a problem that a separate curing time is required and a sealing member varies depending on the shape of the bonding.

DETAILED DESCRIPTION OF THE INVENTION

Technical Problem

Embodiments of the present disclosure have been designed to solve the problems as described above, and thus, an object thereof is to provide a battery pack in which a process can be simplified because no additional bolts or nuts are required to fix the terminal, and a terminal can be fastened even without a separate inner space, thus efficiently utilizing an inner space, and a device including the battery pack.

Technical Solution

A battery pack according to one embodiment of the present disclosure comprises: a battery module having electrode leads; a battery module frame accommodating the battery module; an upper housing including at least one through opening and covering an upper portion of the battery module frame; a busbar positioned at an upper portion of the battery module frame and connected to the electrode leads of the battery module; an internal bolt positioned at an upper portion of the battery module frame, protruding upward through the through opening and connected to the busbar; and a terminal passing through the through opening to be connected to the busbar and the internal bolt, wherein the terminal includes a nut-shaped fastening part which is fastened with the internal bolt.

The busbar may include a through hole formed in the busbar, and the internal bolt may include a body part passing through the through hole to be fastened with a fastening part of the terminal, and an extension part making contact with a lower surface of the busbar.

A diameter of the through hole is smaller than a diameter of the through opening and is larger than a diameter of the body part, and the fastening part may include a first outer diameter portion corresponding to the diameter of the through hole, and a second outer diameter portion corresponding to the diameter of the through opening.

A diameter of the through hole is smaller than a diameter of the through opening and is identical with a diameter of the body part, and the fastening part may include an outer diameter portion corresponding to the diameter of the through opening.

The lower surface of the busbar and the extension part may be weld-bonded.

The nut-shaped fastening part may include and indentation which may receive the body part inserted therein, and a screw thread may be formed on an outer surface of the body part and a screw thread may be formed on an inner surface of the indentation.

The battery pack may further include a circuit control board positioned between the battery module frame and the upper housing, wherein the busbar and the internal bolt may be disposed on an upper surface of the circuit control board.

The terminal may include a polygonal sealing part exposed to the outside of the upper housing.

The sealing part may contact an upper surface of the upper housing with surrounding the through opening.

The sealing part may include a sealing pad positioned between the sealing part and the upper housing.

The polygon may be an octagon.

The terminal may further include an upper protrusion part positioned on an upper surface of the sealing part.

The fastening part, the sealing part and the upper protrusion part of the terminal may be integrally formed.

A device may include the battery pack described above as a power source.

Advantageous Effects

According to embodiments of the present disclosure, since the terminal can be fixed without additional bolts or nuts through the terminal having the nut-shaped fastening part, the assembling structure can be simplified and the manufacturing process thereof can be simplified.

In addition, since the nut-shaped fastening part is fastened to a fixed internal bolt, the terminal can be fastened without a separate inner space, thereby enabling efficient utilization of an inner space.

BRIEF DESCRIPTION OF THE DRAWINGS

FIG. 7 is a view showing a terminal in FIG. 3 by changing a viewing direction.

DETAILED DESCRIPTION OF THE EMBODIMENTS

Figure 1:
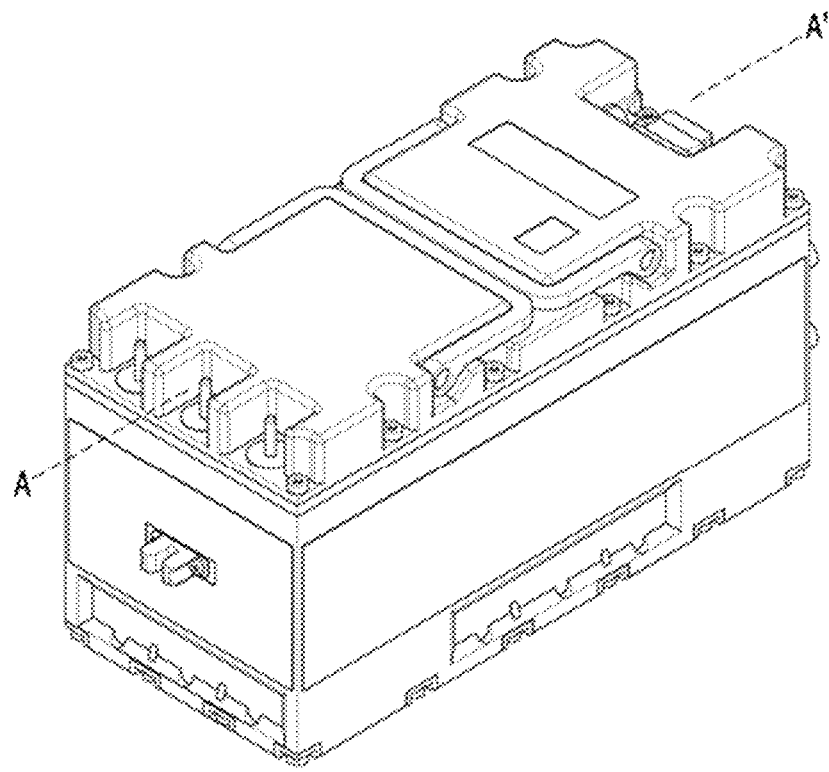
FIG. 1 is a perspective view showing a battery pack according to one embodiment of the present disclosure.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity.

In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper side of the reference portion toward the opposite direction of gravity.

Further, throughout the specification, when a part is referred to as "including" a certain component, it means that it can further include other components, without excluding the other components, unless otherwise stated.

Figure 2:
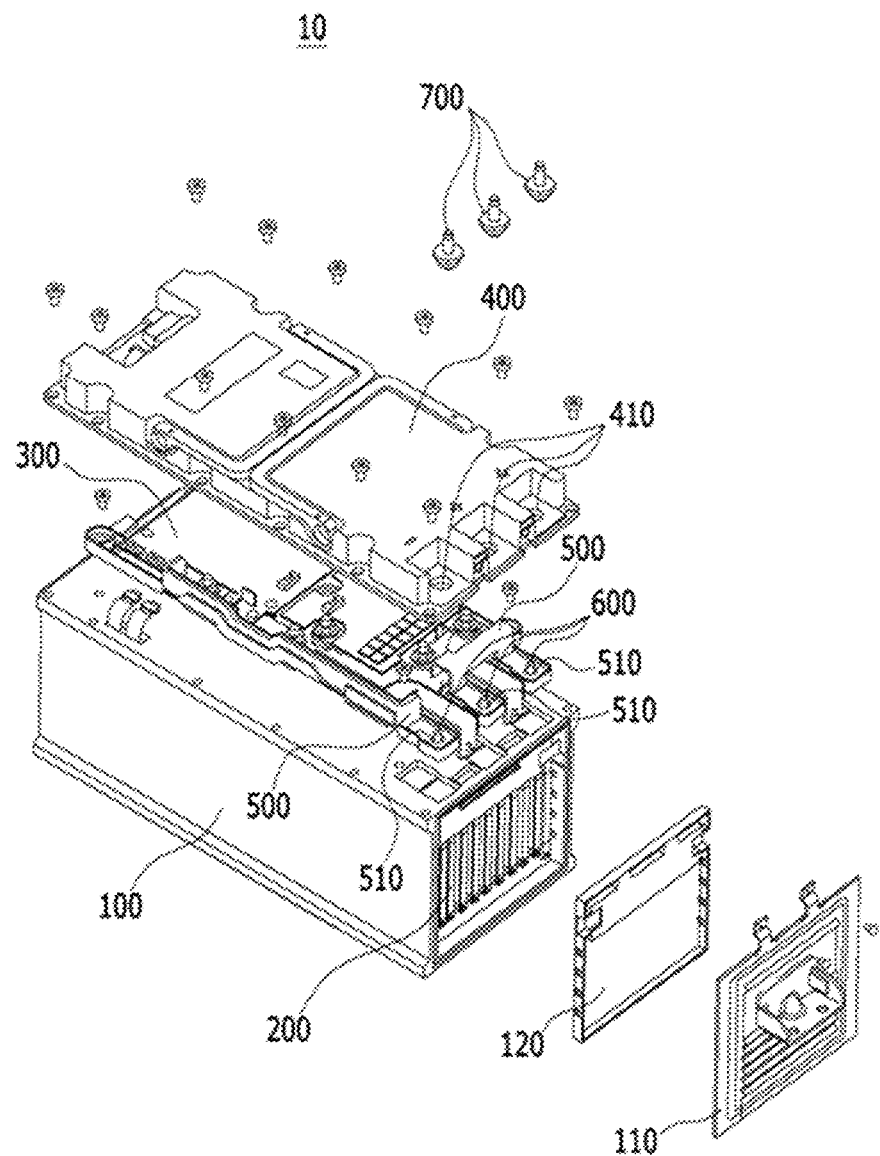
FIG. 2 is an exploded perspective view of the battery pack of FIG. 1.

FIG. 1 is a perspective view showing a battery pack according to one embodiment of the present disclosure, and FIG. 2 is an exploded perspective view of the battery pack of FIG. 1.

Referring to FIGS. 1 and 2, a battery pack 10 according to one embodiment of the present disclosure comprises a battery module frame 100 accommodating a battery module 200, an upper housing 400 covering an upper portion of the battery module frame 100, a busbar 500 positioned at an upper portion of the battery module frame 100 and connected to electrode leads (not shown) of the battery module 200, an internal bolt 600 positioned at an upper portion of the battery module frame 100 and connected to the busbar 500, and a terminal 700 for electrically connecting the battery pack 10 to an external device. More particularly, the terminal 700 is connected to the busbar 500 and the internal bolt 600 in order to electrically connect the battery pack 10 to an external device.

Meanwhile, a circuit control board 300 may be positioned between the battery module frame 100 and the upper housing 400, and the busbar 500 and the internal bolt 600 may be disposed on an upper surface of the circuit control board 300.

Figure 3:
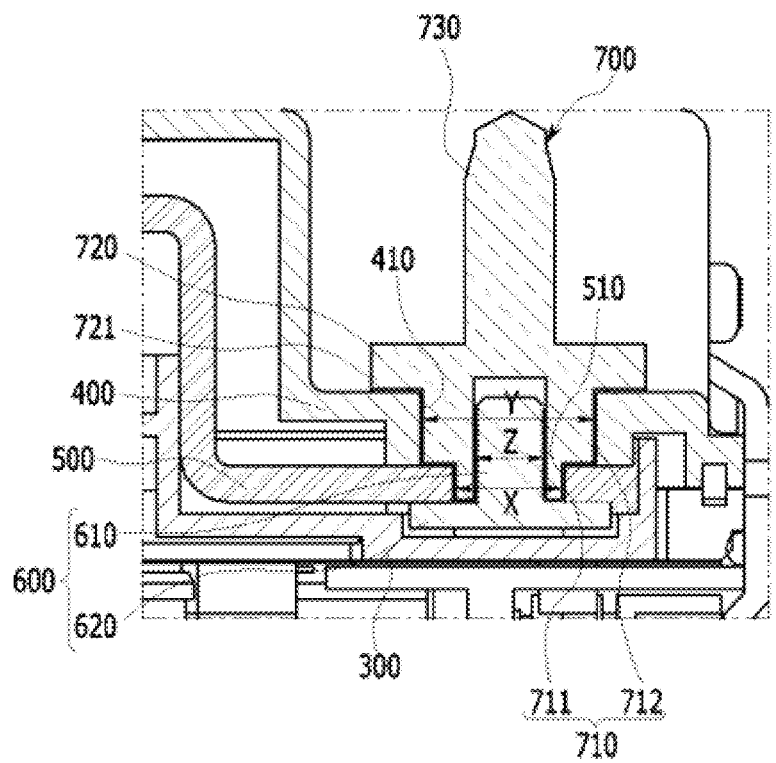
FIG. 3 is a partial cross-sectional view taken along line A-A' in FIG. 1.

FIG. 3 is a partial cross-sectional view taken along line A-A' in FIG. 1.

Referring to FIGS. 2 and 3, the upper housing 400 is in the form of covering the circuit control board 300 and prevents the circuit control board 300, the busbar 500 or the like from being exposed to the outside. However, at least one through opening 410 may be formed in the upper housing 400 so that the terminal 700 exposed at least partially to the outside can be electrically connected to the busbar 500 and the like. The internal bolt 600 protrudes upward through the through opening 410, and the terminal 700 passes through at least one through opening 410 to be connected with the busbar 500 and the internal bolt 600.

Conventionally, in order to connect a terminal as a connection terminal to the battery pack, a method of fixing the terminal using an additional bolt, a method of coupling the terminal by bonding, or the like was used. However, in the case of using the additional bolt, a sealing member is additionally required between the bolt and the terminal, which causes a problem that the structure is complicated and the cost is increased; and in the case of the bonding, the issue has been raised in that a separate curing time is required and a sealing member varies depending on the shape of components requiring the bonding. Further, since the bolt is fastened with the battery pack while facing downward, additional space for fastening was required inside the battery pack.

The battery pack 10 according to one embodiment of the present disclosure has been designed to solve the problems as described above, and by improves the fastening structure of the terminal 700, the terminal 700 can be fixed without an additional bolt or nut, thereby simplifying the assembling structure and the manufacturing process. In addition, since the terminal can be fastened even without a separate inner space, efficient utilization of an inner space is possible. In the following, the structure of the terminal 700 according to one embodiment of the present disclosure will be described in detail.

Figure 4:
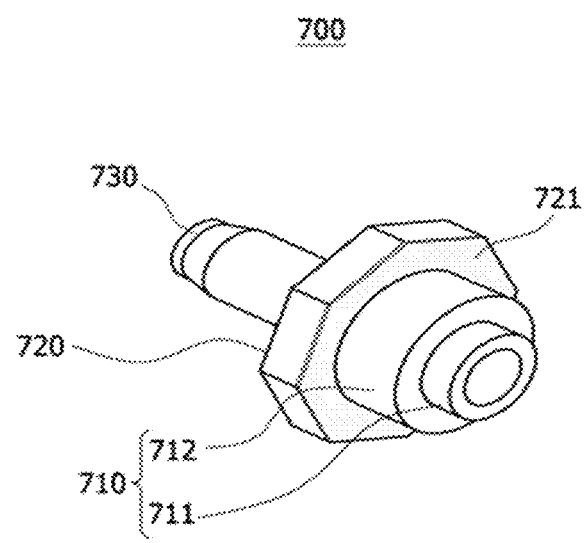
FIG. 4 is a view showing a terminal in FIG. 3.

FIG. 4 is a perspective view showing the terminal 700 in FIG. 3.

Referring to FIGS. 2 to 4, the terminal 700 may include a nut-shaped fastening part 710 which is fastened with the internal bolt 600, a polygonal sealing part 720 which is exposed to the outside of the upper housing 400, and an upper protrusion part 730 positioned on an upper surface of the sealing part 720.

In particular, the fastening part 710, the sealing part 720 and the upper protrusion part 730 may be integrally formed. Therefore, it is possible to implement the terminal 700 capable of sealing from an external environment and connecting to an external device only by fastening the fastening part 710 without additional members. Each of the fastening part 710, the sealing part 720 and the upper protrusion part 730 will be described later in detail.

In addition, the busbar 500 includes a through hole 510 formed in the busbar 500, and the fastening part 710 of the terminal 700 can pass through the through hole 510 of the busbar 500 as well as the through opening 410 of the upper housing 400 to be connected with the bus bar 500 and the internal bolt 600. In particular, the fastening part 710 of the terminal 700 forms a nut shape to be fastened with the internal bolt 600. The nut shape means that an indentation structure into which the internal bolt 600 can be inserted is formed in the fastening part 710 of the terminal 700, and a screw thread is formed on an inner surface of the indentation structure.

More specifically, the internal bolt 600 may include a body part 610 passing through the through hole 510 of the busbar 500 to be fastened with the fastening part 710 of the terminal 700, and an extension part 620 making contact with a lower surface of the busbar 500. The nut-shaped fastening part 710 is fitted to the bolt-shaped body part 610, whereby the terminal 700 can be fastened to the internal bolt 600. A screw thread for fastening may be formed in the body part 610 and the fastening part 710. That is, a screw thread may be formed on an outer surface of the body part 610, and the nut-shaped fastening part 710 may have a screw thread formed on an inner surface of the indentation structure into which the body part 610 is inserted.

The extension part 620 of the internal bolt 600 is for connecting the internal bolt 600 to the busbar 500, and a lower surface of the busbar 500 and the extension part 620 are in contact and connected to each other. Such connection is not limited in the method as long as a physical and electrical connection between the extension 620 and the lower surface of the busbar 500 is possible, but welding is preferable. That is, the extension part 620 and the lower surface of the busbar 500 preferably have a weld-bonded structure.

The extension part 620 of the internal bolt 600 is in contact with the lower surface of the busbar 500 by welding, etc., and at the same time, the body part 610 of the internal bolt 600 is seated on a circuit control board 300 in the state of passing through the through hole 510 of the busbar 500.

Then, after the upper housing 400 is coupled, the fastening part 710 of the terminal 700 passing through the through opening 410 of the upper housing 400 is fastened with the body part 610 of the internal bolt 600, thereby completing the physical and electrical connection of the busbar 500, the internal bolt 600 and the terminal 700. Through this coupling structure, the terminal 700 can be more concisely fastened to the busbar 500 and the internal bolt 600 without an additional bolt or nut. Further, since the terminal 700 forms a nut shape, it can be fastened to the battery pack 10 even without a separate inner space, thereby efficiently utilizing a space inside the battery pack 10.

Referring back to FIGS. 3 and 4, an outer surface of the fastening part 710 of the terminal 700 according to one embodiment of the present disclosure may form a stair-shaped step difference. Specifically, a diameter X of the through hole 510 of the busbar 500 may be smaller than a diameter Y of the through opening 410 of the upper housing 400, and may be larger than a diameter Z of the body part 610 of the internal bolt 600.

The fastening part 710 of the terminal 700 may include a first outer diameter portion 711 corresponding to the diameter X of the through hole 510 and a second outer diameter portion 711 corresponding to the diameter Y of the through opening 410, so as to be matched with the diameter X of the through hole 510 and the diameter Y of the through opening 410 while being fastened with the body part 610. That is, the first outer diameter portion 711 and the second outer diameter portion 712 of the fastening part 710 form the same diameters as the diameter X of the through hole 510 and the diameter Y of the through opening 410, respectively, which are different from each other, whereby the assembling performance of the terminal 700 can be improved when coupled to the upper housing 400 and the busbar 500. In addition, since a stair-shaped step difference is formed on the outer surface through the first outer diameter portion 711 and the second outer diameter portion 712, an alignment error between the busbar 500 and the upper housing 400 can be corrected through fastening when the terminal 700 is fastened, and further, the fastening performance of the assembly structure can be improved.

Figure 5:
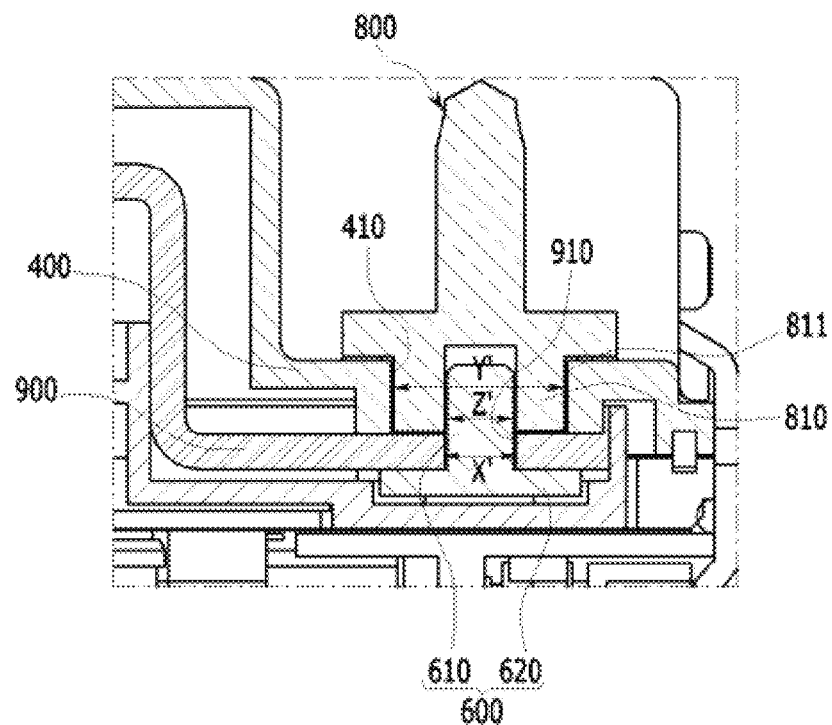
FIG. 5 is a cross-sectional view of a battery pack according to another embodiment of the present disclosure.
Figure 6:
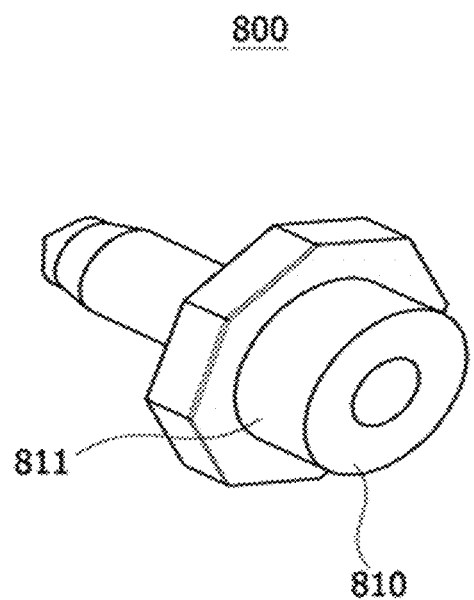
FIG. 6 is a view showing a terminal in FIG. 5.

FIG. 5 is a cross-sectional view of a battery pack according to another embodiment of the present disclosure, and FIG. 6 is a perspective view showing a terminal in FIG. 5.

Referring to FIGS. 5 and 6, the battery pack according to another embodiment of the present disclosure includes an upper housing 400, a busbar 900, an internal bolt 600, and a terminal 800.

Except for the terminal 800 and the busbar 900, the upper housing 400 and the internal bolt 600 form the same or similar structure as in the above-described embodiment, and thus, the description thereof will be omitted because it is repeated with the above-described contents.

A diameter X' of the through hole 910 of the busbar 900 may be smaller than a diameter Y' of the through opening 410 of the upper housing 400 and be identical to a diameter Z' of the body part 610 of the internal bolt 600, and the fastening part 810 of the terminal 800 may include an outer diameter portion 811 corresponding to the diameter Y' of the through opening 410. In addition, the through hole 910 of the busbar 900 may be formed with a screw thread corresponding to an outer surface of the body part 610 on its inner surface, so as to be fastened with the body part 610 of the internal bolt 600.

Through the coupling structure as described above, an extension part 620 of the internal bolt 600 may be in contact with a lower surface of the busbar 900 with a larger area to form a welded structure, whereby there is an effect that the coupling force between the internal bolt 600 and the busbar 900 is increased, and further, the contact resistance is reduced. In addition, the through hole 910 of the busbar 900 may form a screw thread corresponding to an outer surface of the body part 610 to improve the fastening performance.

Referring back to FIGS. 3 and 4, the terminal 700 according to one embodiment of the present disclosure may include a polygon-shaped sealing part 720 that is exposed to the outside of the upper housing 400.

The sealing part 720 may have a structure in which it is in close contact with the upper housing 400 with a larger area than the through opening 410 of the upper housing 400, and may further include a sealing pad 721 positioned between the sealing part 720 and the upper housing 400.

Through the features as described above, it is possible to form a structure in which the upper housing 400 is positioned between the terminal 700 and the busbar 500. Therefore, when the terminal 700 is fastened, the terminal 700 and the upper housing 400 may be in close contact and be more firmly sealed by exhibiting a balance between force in the fastening direction due to bolt-nut coupling, and vertical drag that the upper housing 400 acts on the sealing part 720 by the force in the fastening direction.

Moreover, when fixing the upper housing 400 to the battery module frame 100, a plurality of bolts may be used. If there is a structural feature of the sealing part 720 as described above, the fastening of the terminal 700 may assist not only in connecting the terminal 700 to the battery pack 10, but also in fixing the upper housing 400 to the battery module frame 100.

In addition, the degree of sealing between the terminal 700 and the upper housing 400 is improved by positioning a sealing pad 721 between the sealing part 720 and the upper housing 400, whereby it is possible to absorb a positional tolerance that may occur in assembly between machine parts, and to prevent external substances from flowing into the battery pack. The sealing pad 721 preferably includes at least one of an ethylene propylene diene monomer (EPDM) and a urethane material.

On the other hand, the terminal 700 according to the present embodiment further includes an upper protrusion part 730 positioned on an upper surface of the sealing part 720. The upper protrusion part 730 is electrically connected to an external device through a connection member or the like, so that the battery cells accommodated in the battery pack can be finally connected to the external device.

FIG. 7 is a perspective view showing the terminal 700 in FIG. 4 by changing a viewing direction.

Referring to FIG. 7, the terminal 700 according to one embodiment of the present disclosure may include a sealing part 720 having a polygonal shape, and the shape is not greatly limited, but it is preferable to include an octagonal sealing part 720.

Since the sealing part 720 has a polygonal shape, particularly an octagonal shape, special equipment suitable therefor, for example, a nut driver having a shape matching the polygon should be used for the fastening process of the terminal 700, and so is the case of disassembling the terminal 700. Therefore, a normal user without such special equipment cannot easily disassemble the terminal 700.

Meanwhile, referring back to FIG. 2, the battery module frame 100 for accommodating the battery module 200 may further include a port plate 110 and a side cover plate 120 disposed on the side of the battery module frame 100.

In addition, a circuit control board 300 is mounted in the battery pack 10 and is responsible for opening and closing functions of a current flow, and protection circuit is assembled. As a device that can cut off a power of the battery pack 10, a battery disconnected unit (BDU) housing may be representatively mentioned. The circuit control board 300 such as the battery disconnected unit (BDU) housing can cut off a power of the battery pack 10 when a current flowing into or out of the battery becomes the condition of exceeding a previously set range.

The above-mentioned the battery pack can be applied to various devices. Such devices include, but not limited to, transportation means such as an electric bicycle, an electric vehicle, and a hybrid vehicle, and the present disclosure is applicable to various devices capable of using any battery module, without being limited thereto.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

10: battery pack
100: battery module frame
200: battery module
300: circuit control board
400: upper housing
500, 900: busbar
600: internal bolt
700, 800: terminal

The invention claimed is:

1. A battery pack comprising:
a battery module having electrode leads;
a battery module frame accommodating the battery module;
an upper housing including at least one through opening and covering an upper portion of the battery module frame;
a busbar positioned at an upper portion of the battery module frame and connected to the electrode leads of the battery module;
an internal bolt positioned at an upper portion of the battery module frame, protruding upward through the through opening and connected to the busbar; and
a terminal passing through the through opening to be connected to the busbar and the internal bolt,
wherein the terminal includes a nut-shaped fastening part which is fastened with the internal bolt.

2. The battery pack of claim 1, wherein the busbar includes a through bole formed in the busbar, and
wherein the internal bolt includes:
a body part passing through the through hole to be fastened with the fastening part of the terminal; and
an extension part making contact with a lower surface of the busbar.

3. The battery pack of claim 2, wherein a diameter of the through hole is smaller than a diameter of the through opening and is larger than a diameter of the body part, and
wherein the fastening part includes:
a first outer diameter portion corresponding to the diameter of the through hole; and
a second outer diameter portion corresponding to the diameter of the through opening.

4. The battery pack of claim 2, wherein a diameter of the through hole is smaller than a diameter of the through opening and is identical with a diameter of the body part, and wherein the fastening part includes an outer diameter portion corresponding to the diameter of the through opening.

5. The battery pack of claim 2, wherein the lower surface of the busbar and the extension part are weld-bonded.

6. The battery pack of claim 2, wherein the nut-shaped fastening part includes an indentation configured to receive the body part inserted therein, and
wherein a screw thread is formed on an outer surface of the body part and a screw thread in formed on an inner surface of the indentation.

7. The battery pack of claim 1,
further comprising a circuit control board positioned between the battery module frame and the upper housing,
wherein the busbar and the internal bolt is disposed on an upper surface of the circuit control board.

8. The battery pack of claim 1, wherein the terminal includes a polygonal sealing part exposed to the outside of the upper housing.

9. The battery pack of claim 8, wherein the sealing part contacts an upper surface of the upper housing surrounding the through opening.

10. The battery pack of claim 9, wherein the sealing part includes a sealing pad positioned between the sealing part and the upper housing.

11. The battery pack of claim 8, wherein the polygon is an octagon.

12. The battery pack of claim 8, wherein the terminal further includes an upper protrusion part positioned on an upper surface of the sealing part.

13. The battery pack of claim 12, wherein the fastening part, the sealing part and the upper protrusion part of the terminal are integrally formed.

14. A device comprising the battery pack according to claim 1 as a power source.

* * * * *